Figure 1:
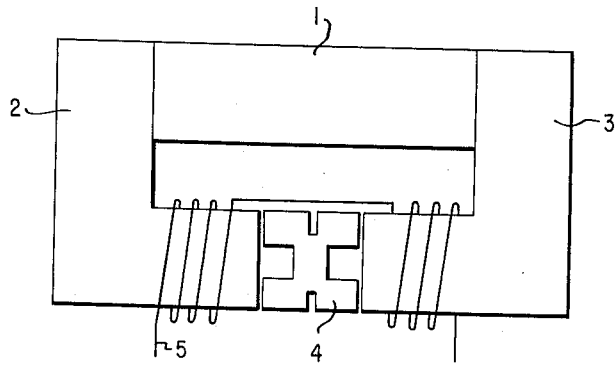

Dec. 28, 1965  F. C. HAZZARD  3,226,629
CONVERTER-CONTROLLER TRANSFORMER SYSTEM
Filed Aug. 30, 1961  4 Sheets-Sheet 1

INVENTOR.
FRANK C. HAZZARD
BY William D. Roberson
ATTORNEY.

Dec. 28, 1965  F. C. HAZZARD  3,226,629
CONVERTER-CONTROLLER TRANSFORMER SYSTEM
Filed Aug. 30, 1961  4 Sheets-Sheet 2

INVENTOR.
FRANK C. HAZZARD
BY William D Roberson
ATTORNEY.

Dec. 28, 1965    F. C. HAZZARD    3,226,629
CONVERTER-CONTROLLER TRANSFORMER SYSTEM
Filed Aug. 30, 1961    4 Sheets-Sheet 3
FIG. 9
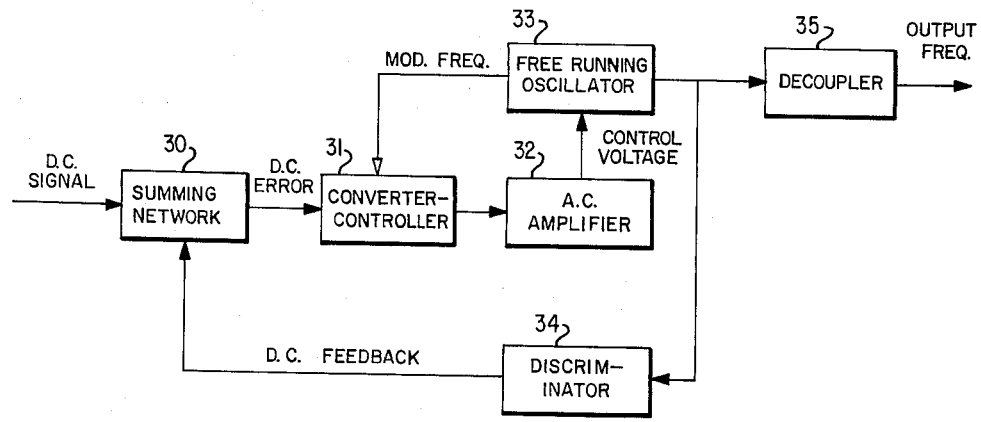
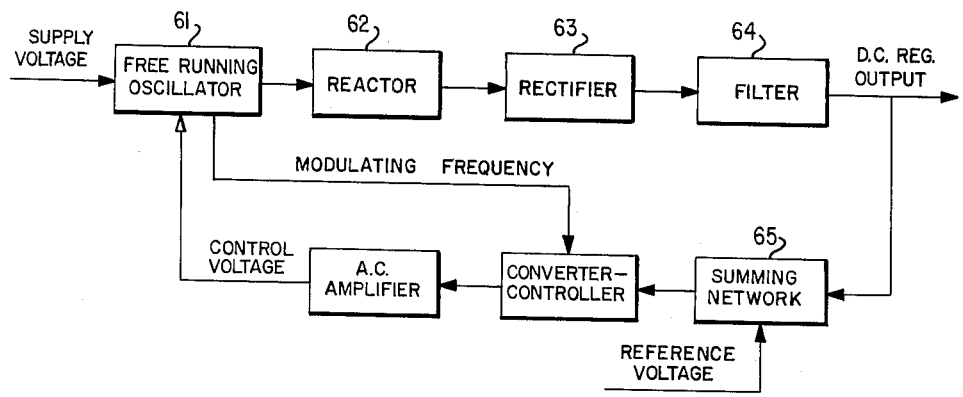
FIG. 11
INVENTOR.
FRANK C. HAZZARD
BY William D Roberson
ATTORNEY.

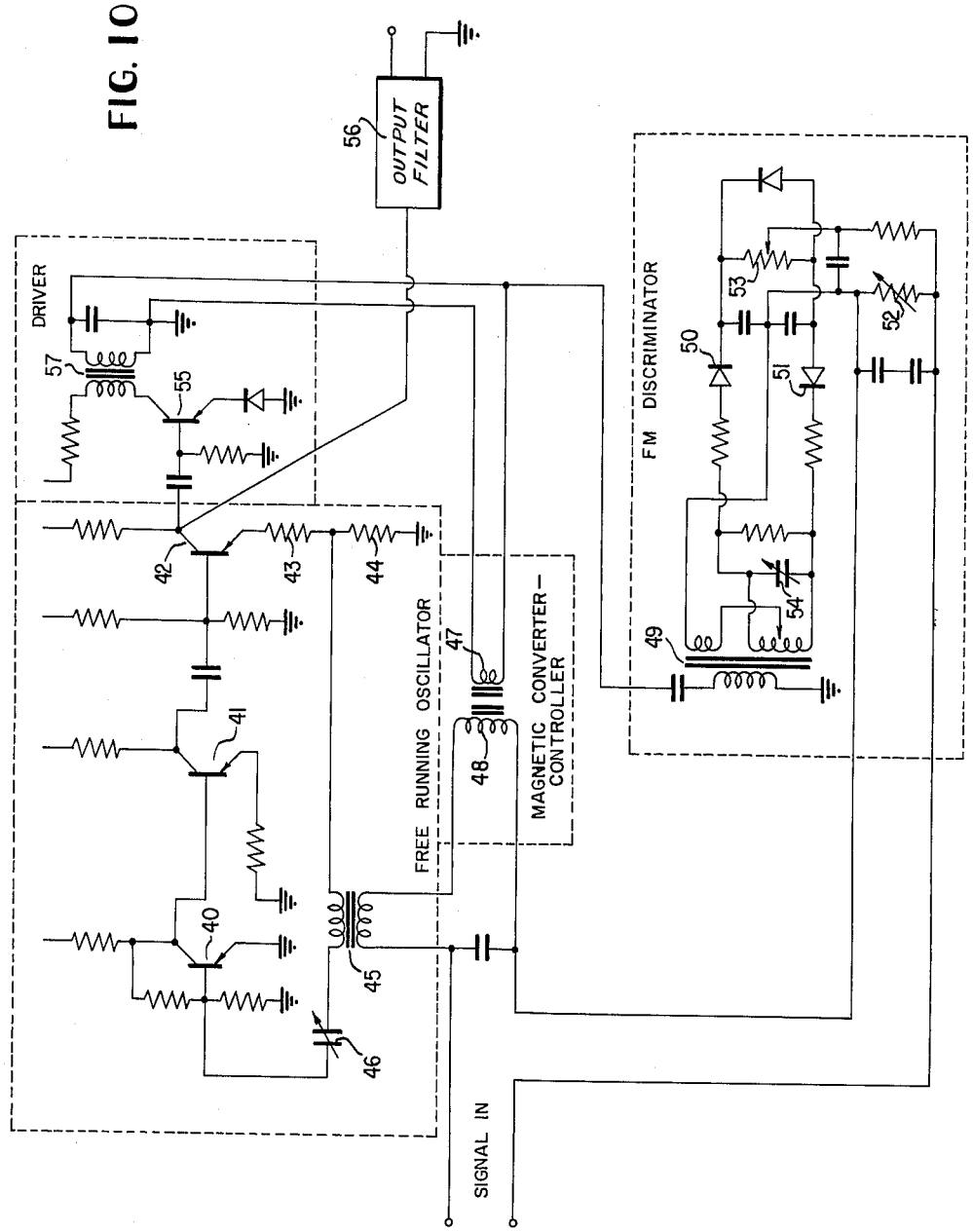

United States Patent Office 3,226,629
Patented Dec. 28, 1965

3,226,629
CONVERTER-CONTROLLER TRANSFORMER
SYSTEM
Frank C. Hazzard, Orlando, Fla., assignor to Martin-Marietta Corporation, a corporation of Maryland
Filed Aug. 30, 1961, Ser. No. 134,923
11 Claims. (Cl. 323—56)

This invention relates to magnetic type converter-controllers and more particularly to a magnetic device used to convert a D.C. voltage into an A.C. voltage and to control the phase and amplitude of the A.C. output in accordance with the magnitude and polarity of the D.C. input voltage.

In many applications, it is quite desirable to utilize a magnetic controller to convert a small D.C. voltage to an A.C. output voltage. Such devices have application, for example, in servo circuits wherein a small D.C. error voltage is used to control an A.C. power voltage, in variable frequency oscillators in which a D.C. control signal is used to control the output frequency of the oscillator, and in regulated D.C. power supplies.

Prior art magnetic type devices have not been entirely satisfactory for use in certain applications such as those mentioned above. Numerous magnetic amplifiers have been developed for controlling an A.C. source in accordance with a D.C. input voltage. However, in certain applications it is desirable that the magnetic device have a zero A.C. output voltage when the D.C. input voltage is zero. Further, it is desirable that the phase of the A.C. output voltage undergo a 180° reversal when the D.C. control voltage passes through the zero point and increases in the opposite direction.

Accordingly, it is an important object of this invention to provide an improved magnetic converter-controller providing means for controlling the amplitude of an A.C. output voltage in accordance with the magnitude of a D.C. input voltage and in which the A.C. output is of zero magnitude when the D.C. input voltage is zero and in which the A.C. output voltage undergoes a 180° phase reversal for a change in polarity of the D.C. input voltage.

It is a further object of the present invention to provide an improved variable frequency oscillator utilizing the magnetic converter-controller of this invention.

It is another object of the present invention to provide an improved regulated D.C. power supply utilizing the magnetic converter-controller of this invention.

In accordance with one embodiment of the invention, the converter-controller includes a magnetic assembly consisting of a permanent magnet, two field pieces, a flux diverter, a field coil, a D.C. control winding and an A.C. output winding. The permanent magnet provides a north-south magnetic bias at the interface of the flux diverter and the field pieces. The field coil superimposes an alternating flux component upon the unidirectional flux from the permanent magnet. The flux diverter provides a path for the flux to flow between the field pieces and in the absence of a D.C. control current, the flux flows through the legs of the flux diverters in such a manner that no flux links the A.C. output coil. Therefore, no voltage is induced in the A.C. output coil. However, when a D.C. control current is applied, the A.C. flux flowing through the flux diverter is changed in direction so that it passes through the A.C. output coil thereby inducing an output voltage in the coil. The amount of flux cutting the output coil and, hence, the magnitude of the A.C. output voltage is dependent upon the magnitude of the D.C. voltage applied to the control field. Further, when the polarity of the D.C. control voltage is reversed, the alternating flux is diverted through the output coil in the opposite direction thereby providing an output voltage having a 180° phase difference from the output voltage previously produced.

Figure 2:
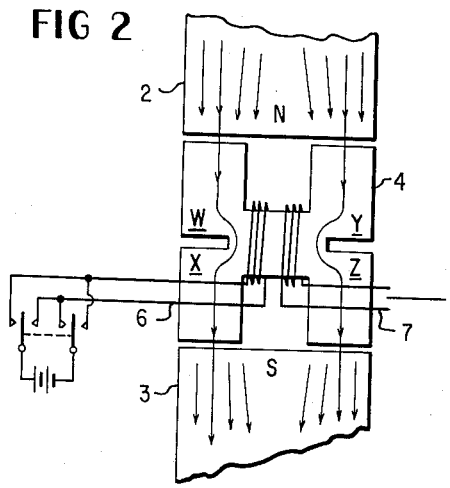
Figure 3:
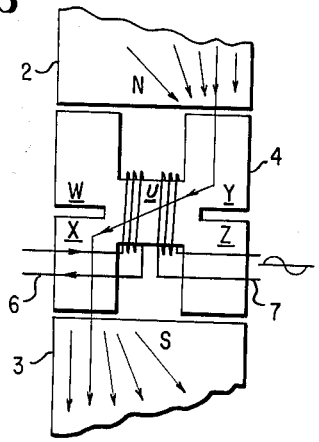
Figure 4:
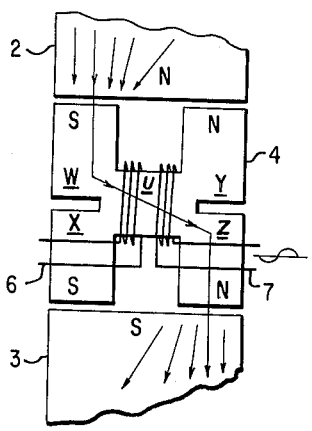
Figure 5:
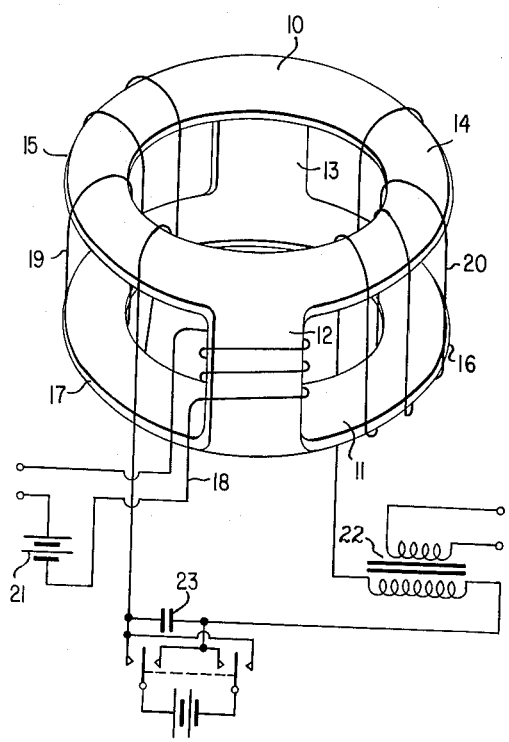
Figure 6:
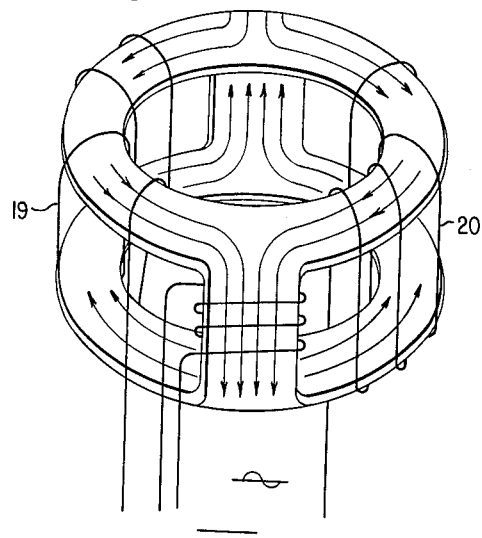
Figure 7:
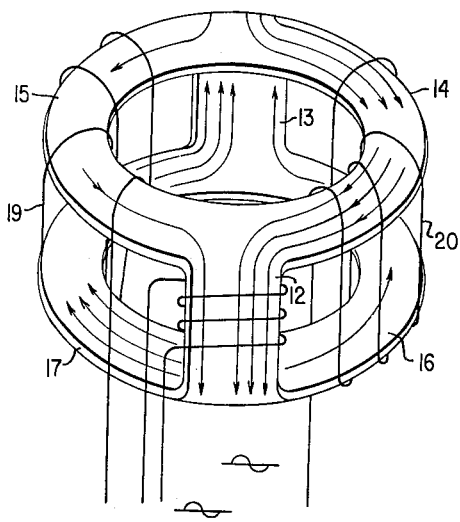
Figure 8:
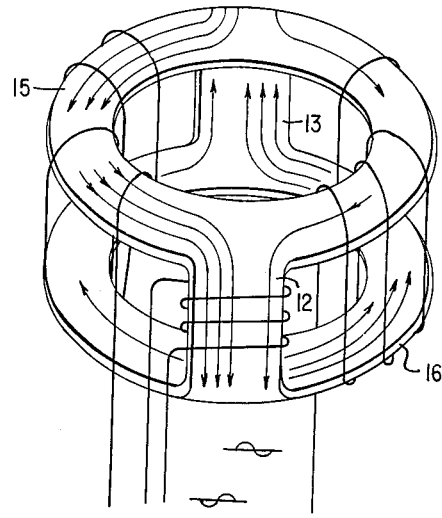

The foregoing and other objects, features and advantages of the invention will be apparent from the following more particular description and the appended claims and as illustrated in the accompanying drawings in which:

FIGURE 1 shows the magnetic converter-controller;
FIGURE 2 shows the interface of the field pieces and the flux diverter with the flux paths being shown as they exist when no D.C. control voltage is applied;
FIGURE 3 shows the interface of the field pieces and the flux diverter and the flux paths which exist when a D.C. control voltage of one polarity is applied;
FIGURE 4 shows the interface of the field pieces and the flux diverter and the flux paths which exist when a D.C. control voltage of the opposite polarity is applied;
FIGURE 5 shows an improved, preferred embodiment of the magnetic converter-controller of the present invention;
FIGURE 6 shows the flux paths existing in the improved converter-controller when no D.C. control voltage is applied to the improved converter-controller;
FIGURE 7 shows the flux paths which exist when a control voltage of one polarity is applied to the improved converter-controller;
FIGURE 8 shows the flux paths which exist when a control voltage of the opposite polarity is applied to the improved converter-controller;
FIGURE 9 is a block diagram of a sub-carrier oscillator utilizing the converter-controller of this invention;
FIGURE 10 is a circuit diagram of the sub-carrier oscillator; and
FIGURE 11 is a block diagram of a regulated D.C. power supply utilizing the magnetic converter-controller of this present invention.

Referring to FIGURE 1, the converter-controller includes a permanent magnet 1 and two field pieces 2 and 3. The permanent magnet 1 provides a magnetic bias at the interfaces of flux diverter 4. An alternating flux component is superimposed upon the unidirectional flux by the field coil 5.

The flux at the interfaces of the field pieces and flux diverter is better seen in FIGURE 2 in which like numerals denote like components. A D.C. control winding 6 and an output winding 7 are shown in FIGURE 2. The field coil 5 superimposes an alternating flux component upon the unidirectional flux from the permanent magnet. The relation of flux intensities, direct and alternating, is such that the field strength at the interfaces of flux diverter 4 and field pieces 2 and 3 varies as the alternating component varies but never reverses polarity.

Flux diverter 4 provides a path for the flux to flow between field pieces 2 and 3. In the absence of a D.C. control current in coil 6, the flux divides as shown in FIGURE 2 and flows from the north field piece 2 through legs W–X and Y–Z of the flux diverter 4 into the south field piece 3. In traversing this path, no flux links coil 7 and therefore no output voltage is induced in coil 7.

However, when a D.C. control voltage is applied to coil 6, as shown in FIGURE 3, an additional control field is established by the flux from control winding 6. This flux renders legs W and X north poles and it renders legs Y and Z south poles. Hence, flux leaving the north field piece 2 is repelled from leg W and attracted to leg Y. The south field piece 3 attracts flux from leg X and repels from leg Z. As a consequence, to maintain flux accountability, flux entering the Y leg must cross the center leg U and leave by leg X. This flux crossing leg U links output coil 7 and induces an output voltage in coil 7. The magnitude of the A.C. output voltage varies in accordance with the D.C. control voltage applied to control coil 6. That is, the greater the voltage applied to coil 6, the more flux that will be diverted through output coil 7 and the greater the voltage developed. The phase of the output voltage on coil 7 will have a predetermined relationship to the phase of the input voltage applied to input coil 5.

When the D.C. control voltage is applied to coil 6 with reversed polarity, as shown in FIGURE 4, the control field induced by coil 6 reverses polarity. Consequently, the magnetic flux from field piece 2 follows the path through leg W, through leg U and leg Z to pole piece 3. Since the flux traverses output coil 7 in the opposite sense, an output voltage is produced having a 180° phase shift with respect to the output voltage produced when the input voltage is at the opposite polarity.

The flux diverter 4 must be shaped so that the magnetic reluctance is nearly the same for any of the magnetic paths shown in FIGURES 2, 3 or 4. It is thus possible to deviate the flux more readily with less D.C. energy.

The magnetic material of the flux diverter 4 and the field pieces 2 and 3 is dependent upon the frequency of operation. For optimum operation a high D.C. permeability is required; however, a compromise in magnetic materials may be required as the operating frequency is increased in order to offset extreme eddy current losses.

The energy available in output winding 7 is a function of the magnitude of the flux linking the coil 7. Therefore, the energy available in coil 7 is also a function of the D.C. ampere turns in coil 6. This D.C. field deviates the flux to cause linkage with coil 7. By optimizing the configuration of the flux deviator 4 and by using a high level A.C. input voltage, an extremely large energy gain is possible for control purposes. That is, a very small D.C. energy applied to coil 6 can cause very large A.C. energy fluctuations in winding 7.

An improved, and preferred embodiment of the magnetic converter controller is shown in FIGURE 5. The core assembly consists of two rings 10 and 11, of high permeability material, separated by a dielectric. The rings 10 and 11 are joined at location 180° apart by additional core material 12 and 13. The ring 10 is formed of arms 14 and 15 and the ring 11 is formed of arms 16 and 17. The total magnetic assembly consists of six major magnetic loops made up of the following arms: 14, 15; 16, 17; 15, 12, 17, 13; 14, 12, 16, 13; 15, 12, 16, 13; and 14, 12, 17, 13.

A primary excitation winding 18 is positioned on arm 12. The excitation winding may also be placed on arm 13 or may be shared by arms 12 and 13. Under symmetrical impedance conditions, the flux generated by winding 18 divides evenly between magnetic loops 15, 12, 17, 13 and 14, 12, 16 13.

The secondary control winding 19–20 is wound on arms 15, 17, 14 and 16.

The symmetrical impedance condition is shown in FIGURE 6. No voltage is included in winding 19 since the same flux traverses the core of coil 19 in both directions thereby yielding a zero net flux linkage. Similarly, zero net flux links coil 20 and hence the total voltage across the secondary windings 19–20 is zero. Referring to FIGURE 7, as a D.C. voltage is applied to winding 19–20 such that winding 19 is more negative than winding 20, the A.C. flux divides unsymmetrically, that is most of the flux flows through the arms 12, 17, 13 and 14. As a negative control voltage is applied to winding 19, the end of leg 12 nearest the arm 15 is a south magnetic pole and the end of leg 12 nearest arm 17 is a north magnetic pole. The control current in windings 19–20 produces north poles in arms 15 and 17 adjacent to arm 12. In accordance with the laws of magnetic attraction and repulsion, the D.C. flux is decreased in arms 17 and 14 and increased in arms 15 and 16. This causes a net A.C. flux in the cores of windings 19 and 20, thereby inducing voltages in windings 19 and 20 that are in phase and therefore results in an output signal at the same frequency and phase as the excitation voltage. Similarly, when the opposite D.C. polarity is applied to the excitation coil 18 as is shown in FIGURE 8, the majority of the flux passes through arms 12, 16, 13 and 15. This unbalance also generates an A.C. output voltage across winding 19–20, but of the opposite phase than the output produced under the conditions shown in FIGURE 7.

The maximum A.C. voltage obtainable from any one of the four arms of the input/output winding of the magnetic assembly is given by the following expression:

$$E_{max} = 4.44 N_s f \theta_{max} \times 10^{-8} \text{ volts} \quad (1)$$

where $N_s$ is the number of turns on any arm of the input/output winding, $f$ is the operating frequency, and $\theta$ max is the flux in any arm at core saturation.

The magnetic cores and windings are so arranged that the total voltage at the input/output terminals adds to zero when $\theta$ max is the same value for all arms. When $\theta$ max is not the same for all arms, an output voltage appears at the input/output terminal that is proportional to the inequalities of $\theta$ in each arm.

Differentiating Equation 1 shows the following relation to hold:

$$\Delta E_{max} = 4.44 N_s f \times 10^{-8} \Delta \theta_{max} \quad (2)$$

The control flux is given by the following expression:

$$\theta = .4\pi N I \mu A / L \quad (3)$$

Combining with Equation 2 it can be shown that the factors controlling the output voltage are:

$$\Delta E \alpha N_s^2 f \mu \frac{A}{L} I \quad (4)$$

where $N_s$ is the number of turns on control winding 19–20, $f$ is the operating frequency, $\mu$ is the core permeability, $A/L$ is the core cross-sectional area divided by the length of the control loop, and $I$ is the D.C. control current.

Equation 2 relates that the maximum voltage induced in the secondary winding is proportional to a change in the maximum flux. The maximum flux at frequency $f$ can be changed by adding a D.C. flux component causing the core to saturate at a lower A.C. flux value. The change in E max will, therefore, be proportional to the amount of D.C. flux added to the core. This D.C. flux is provided by the D.C. current on the secondary or control winding 19–20. This D.C. flux would alternately add to and subtract from the A.C. flux on alternate half cycles. This would cause the phase of the voltage induced in winding 19–20 to reverse phase on alternate half cycles thereby inducing a pulsating unidirectional voltage in winding 19–20. To remedy this condition, a unidirectional flux is added to the primary loop so that the alternating flux never reverses by passing through zero. The voltage induced by the unbalance of flux in the core of windings 19–20 will now be sinusoidal. The control flux will now exhibit bi-direction characteristics in that it will add to or subtract from a unidirectional flux existent from the primary circuit.

This unidirectional primary flux may be obtained by a direct current bias source 21 connected to the primary winding 18. This unidirectional primary flux could also be obtained by including some permanent magnetic material in legs 12 and/or 13.

A transformer 22 is used to isolate the control circuit from the output circuit FIGURE 5. The high A.C. impedance of the primary transformer 22 and the low A.C. impedance of capacitor 23 enables essentially full A.C. output to be impressed across the transformer and very little A.C. signal is injected into the control signal source.

In a prototype model of the magnetic converter-controller which has been constructed and successfully operated, single layers of .014 inch Hymu 80 sheet stock was used. The rings 14–15 and 16–17 have an outside diameter of 17/32 inch and 13/32 inside diameter. The arms 12 and 13 are 1/8 inch wide. The rings 14–15 and 16–17 are formed over a fiberglass washer of the same diameters and ³⁄₃₂ inch thick. Prior to winding, the Hymu 80 core was annealed at 2,000° F. in an argon atmosphere to remove all traces of work hardening encountered during fabrication. Windings 19 and 21, wound with a toroid winding machine, have 850 turns of number 42 gauge magnetic wire each with a total D.C. resistance of approximately 50 ohms. The excitation winding 18 was wound on two fiber sleeves and slipped over the arm 12. A total of 1200 turns of #42 wire form the excitation winding. A small Alnico V magnet was clamped between the two sections of arm 12 to provide D.C. flux equivalent to approximately 10 ampere turns.

One important application of the magnetic converter-controller is the sub-carrier oscillator circuit shown in block form in FIGURE 9 and in circuit form in FIGURE 10. Such an oscillator produces an output frequency which varies in accordance with a very small D.C. input signal. The oscillator can be used with all voltage producing transducers with millivolt output and greater. For example, thermocouples, resistance bridges, potentiometers and piezoelectric transducers can be used. Because a bias source is provided in the negative feedback loop as will be subsequently described, the potential required to use resistance changing transducers such as resistance bulbs and thermistors is also present.

Referring to FIGURE 9, the D.C. input control voltage is compared with a D.C. feedback voltage in summing network 30 to produce a D.C. error signal. This error signal is applied to the control winding of the converter-controller 31. The D.C. error signal is applied, for example, to the winding 6 of the embodiment shown in FIGURE 2 or to the winding 19–20 of the embodiment shown in FIGURE 5. The A.C. output of the converter-controller is amplified in amplifier 32 and applied to free running oscillator 33. The output of free running oscillator 33 is the A.C. input to converter-controller 31 and is applied, for example, to windings 5 of the embodiment shown in FIGURE 1 or to winding 18 of the embodiment shown in FIGURE 5. The oscillator frequency is also applied to a discriminator 34 which provides a D.C. output with a known relationship to the oscillator frequency. This D.C. output is compared to the D.C. input signal in the summing network 30. When these two volt D.C. values have the desired relationship, the error signal from the summing network will be very small and will be a function of the open loop system gain. When the relationship of these two D.C. values is incorrect, the D.C. error signal from the summing network is applied to the D.C. control winding of the converter-controller 31. The fact that the discriminator 34 provides a D.C. bias voltage allows the oscillator to be used in conjunction with resistance type transducers as previously mentioned.

The D.C. error signal from the summing network 30 deviates the flux in the flux converter and induces an A.C. voltage in the A.C. output winding. This A.C. voltage is amplified and applied to the free running oscillator in the proper phase to shift the oscillator frequency in a direction to correct the relationship between input signal and discriminator output. The gain of the A.C. amplifier is sufficiently high so that the frequency would shift far beyond the desired frequency if the feedback were open. However, as the desired frequency is approached, the input signal and the discriminator signal approach the desired relationship so that A.C. control voltage from the flux converter will be of the value necessary to maintain the desired shift in frequency. Hence, a controlled relationship is established between the input D.C. signal and the oscillator output frequency.

A decoupler 35 is provided for impedance matching purposes. It also provides a means for blocking other frequencies connected to the output circuit from feeding back to the oscillator.

Referring to FIGURE 10, the sub-carrier oscillator is shown in circuit form with the components making up each of the blocks in FIGURE 9 being roughly grouped and included within dotted lines. The basic oscillator loop includes transistors 40, 41 and 42. Positive feedback is achieved by coupling some of the emitter current from transistor 42 to the base of transistor 40. The emitter current which is coupled back to transistor 40 is determined by the values of resistors 43 and 44, the input impedance of transistor 40 and the current gain of transistors 40, 41 and 42.

Transistors 40 and 41 are essentially A.C. current amplifiers. The transistor 42 is biased at midpoint potential and is driven full on and full off by the output of transistor 41. A series resonant circuit including transformer 45 and variable capacitor 46 is included in the feedback loop to establish the free running frequency.

The converter-controller shown in FIGURE 2 or in FIGURE 5 and described in conjunction therewith may be used as the magnetic modulator. Winding 47 in FIGURE 10 corresponds to winding 18 in FIGURE 5; winding 48 in FIGURE 10 corresponds to winding 19–20 in FIGURE 5 and the transformers 45 in FIGURE 10 corresponds to the transformer 22 in FIGURE 5. The A.C. output of the magnetic modulator is coupled by transformer 45 to the reactance in the oscillator feedback loop with the proper phase relationship to change the reactance of the series tuned circuit and thereby change the frequency of the oscillator as a function of the polarity and magnitude of control current into the magnetic modulator.

The A.C. excitation and oscillator frequency is supplied through winding 47 which is driven by the free running oscillator. The control winding 48 is ungrounded providing a completely floating input circuit.

The FM discriminator provides a D.C. output voltage as a function of oscillator frequency. This D.C. voltage is used to provide negative feedback around the entire oscillator. It is connected in series opposition to the oscillator input control voltage. Any difference in voltages supplies a current to the modulator and changes the oscillator frequency until the error is minimized. By this means, great stability and accuracy is obtained in this system. The FM discriminator includes the usual transformer 49, diodes 50 and 51 and smoothing capacitors.

The span of sensitivity of the oscillator is controlled by adjusting the amount of feedback obtained from the discriminator. This can be adjusted by means of variable resistors 52 and 53 and variable capacitor 54. The discriminator also provides an adjustable source of bias potential to the magnetic modulator so that the oscillator frequency may be set to any frequency within its bandwidth without the need of an external biasing circuit. The discriminator is ungrounded providing a completely floating feedback circuit.

The driver stage includes the single transistor 55 driven as a switch to provide a square wave at oscillator frequency to the magnetic modulator and to the FM discriminator. This type of driving conserves battery power.

An output filter 56 is provided to reduce the harmonic distortion to an acceptable level.

The operation of the sub-carrier oscillator of FIGURE 10 can be described briefly as follows. Capacitor 46 and transformer 45 determine the free running frequency of the oscillator. These two components form a series resonant circuit which provides minimum impedance at resonance and, thereby, provides for maximum current feedback in the loop at the resonant frequency. The feedback current produces a lagging voltage drop across capacitor 46 and a leading voltage drop across transformer 45. At resonance these voltages are equal in amplitude and 180° apart in phase and both are in quadrature with the feedback current. When a voltage is impressed across the primary of transformer 45 in phase with the reactive drop across the secondary of transformer 45, the conditions of resonance described above are upset and the oscillator will shift frequency until the conditions of resonance are again satisfied. The voltage impressed across the primary of transformer 45 appears as inductive or capacitive reactance depending on whether it is in phase with the reactive drop across the secondary of the transformer 45 or in phase with the reactive drop across capacitor 46. This additional reactance forms a part of the frequency determining parameters.

The conditions for resonance are expressed as follows:

$$fr = \frac{1}{2\pi} L^{-1/2} C^{-1/2} \quad (5)$$

Taking the natural log of Equation 5 and differentiating:

$$\frac{dfr}{fr} = \frac{-\frac{1}{2} dL}{L} \frac{-\frac{1}{2} dC}{C} \quad (6)$$

The current at resonance is constant and determined by the feedback required for sustaining oscillation. Therefore, for a given current, the voltage drops across the reactive components are given as:

$$V_L = k_j L \text{ and } V_c = -k_j C \quad (7)$$

Taking the natural log of Equation 7 and differentiating:

$$\frac{dV_L}{V_L} = \frac{dL}{L} \text{ and } \frac{dV_C}{V_C} = \frac{dC}{C} \quad (8)$$

Combining Equations 6 and 8:

$$\frac{dfr}{fr} = \frac{-\frac{1}{2} DV_L}{V_L} \frac{-\frac{1}{2} dV_C}{V_C} \quad (9)$$

For the condition of resonance, the voltage amplitude across the capacitance reactance is equal to the voltage amplitude across the inductive reactance. Therefore, when a given percentage change in voltage is impressed across the inductive reactance by applying a voltage to the primary of transformer 45, the same percentage change in voltage will be evident across the capacitance reactance as the oscillator changes to a new resonant frequency and the contribution of both reactances will cause the same percentage change to occur in resonant frequency.

The voltage impressed across transformer 45 primary for the purpose of controlling frequency is supplied by the converter-controller. The converter-controller provides an output voltage at the oscillator frequency which is proportional to the magnitude of the D.C. control current. The voltage is in phase with either the capacitive drop across 46, or the inductive drop across 45 secondary. Reversing the D.C. current polarity causes a 180° phase shift in the output voltage.

In an actual circuit configuration of the sub-carrier oscillator of FIGURE 10, the magnetic modulator previously described was used. The transformer 45 consisted of 1200 turns of #42 wire as the primary winding and 50 turns of #42 wire as the secondary winding. The core of transformer is a type 55050–A2 molybdenum permalloy powder core made by Magnetics, Inc. The capacitor 46 is used to adjust the center frequency and is approximately 0.2 mfd. for 10.5 kc. free running frequency. The transistors 40, 41 and 42 are Philco type 2N1130. The transformer 57 has 1100 turns or #40 wire in the primary and 800 turns of #40 wire in the secondary. The core is a type 55050–A2 powder core.

Another application of the magnetic converter-controller of this invention is the highly regulated D.C. power supply shown in FIGURE 11. A free running oscillator 61 is used to convert a D.C. source of power into alternating current. This oscillator also performs the function of providing a means of high regulation. A reactance 62 is placed between the oscillator section and the rectifier section 63 to provide a variable impedance for regulation. This impedance is made variable by varying the oscillator frequency. The rectifier output is filtered in filter 64 and made available for output power. The output of the power supply can then be monitored for voltage or current as desired and this monitored parameter compared in a summing network 65 with a voltage or current reference This reference may be external or an internal reference such as a Zener diode. The D.C. error signal from the summing network is then applied to the converter-controller to provide an A.C. control voltage to shift the oscillator frequency until a null is obtained in the summing network error output. Hence, the D.C. output is regulated to a high degree of accuracy and in a short response time for any fluctuations that may occur in the supply voltage or the output load. This form of regulation provides good dynamic response to changes in input voltage or output load by selection of a high oscillator frequency. Small size and weight are also possible due to the high frequency.

While certain embodiments of the present invention have been shown and described, it will, of course, be understood that various other modifications may be made without departing from the true spirit and scope of the invention. The appended claims are, therefore, intended to cover any such modifications.

What I claim as new and desire to secure by Letters Patent of the United States is:

1. A magnetic controller comprising a first field piece and a second field piece, a permanent magnet, said permanent magnet being positioned between first ends of said first and second field pieces, a flux diverter, said flux diverter being positioned between second ends of said first and second field pieces to form a closed magnetic path with said permanent magnet and said first and second field pieces, a D.C. control winding wound on said flux diverter, an A.C. output winding wound on said flux diverter, the turns of said D.C. control winding and said A.C. output winding being positioned longitudinal to said closed magnetic path in the region of said flux diverter, an A.C. input winding, said A.C. input winding having turns on said first field piece and turns on said second field piece, the turns of said A.C. input winding being perpendicular to said closed magnetic flux path in the region of said field pieces, means for applying a source of A.C. potential to said A.C. input winding whereby alternating flux is produced in said flux diverter, means for applying a D.C .potential of a first polarity to said D.C. control winding, said D.C. control winding inducing a magnetic field in said flux diverter so that said alternating flux is diverted perpendicular to and through said A.C. output winding in a first direction thereby producing an A.C. output voltage of a first phase in said A.C. output winding, means for applying a D.C. control voltage of the opposite polarity to said D.C. control winding, said D.C. control winding inducing a magnetic field in said flux diverter so that said alternating flux is diverted perpendicular to and through said A.C. output winding in the opposite direction thereby producing an A.C. output voltage of the opposite phase.

2. A magnetic controller comprising a first field piece and a second field piece, a flux diverter positioned between said first and second field pieces, means for applying a unidirectional magnetic flux to the interfaces between said field pieces and said flux diverter, an A.C. input winding, said A.C. input winding having turns on said first field piece and turns on said second field piece, means for applying an A.C. current to said A.C. input winding to produce an alternating flux in said first and second field pieces and in said flux diverter, said alternating flux being normally perpendicular to the interfaces between said first and second field pieces and said flux diverter, a D.C. control winding wound on said flux diverter, said D.C. control winding having turns parallel to the normal A.C. flux through said flux diverter, an A.C. output winding wound on said flux diverter, said A.C. output winding having turns parallel to the normal A.C. flux through said flux diverter, means to apply a D.C. voltage of a first polarity to said D.C. control winding, said D.C. voltage inducing a first magnetic field in said flux diverter, said first magnetic field diverting said alternating flux through said A.C. output winding in a first direction thereby producing an A.C. output voltage of a first phase, means for applying a D.C. control voltage of a second polarity to said D.C. control winding thereby producing a second magnetic field in said flux diverter, said second magnetic field diverting said A.C. flux through said A.C. output winding in the opposite direction thereby producing an A.C. output voltage of the opposite phase.

3. The controller recited in claim 2 wherein said flux diverter is of high permeability magnetic material and is of rectangular configuration, a first end face of said flux diverter providing a first interface with said first field piece, an opposite face of said flux diverter providing another interface with said second field piece, said first end face of said flux diverter being defined by first and second protruding legs, the turns of said D.C. control and output windings being positioned between said first and second protruding legs, said opposite end face of said flux diverter being defined by third and fourth protruding legs, the turns of said D.C. control winding and said A.C. output winding being positioned between said third and fourth protruding legs.

4. The converter recited in claim 3 wherein said unidirectional magnetic flux induces a first magnetic pole in the field piece at said first interface and an opposite magnetic pole at said other interface, said D.C. control winding being positioned so that a D.C. potential of said first polarity induces said first magnetic pole in said second and fourth protruding legs and said opposite magnetic pole in said first and third protruding legs and said D.C. potential of said opposite polarity induces said opposite magnetic pole in said second and fourth protruding legs and said first magnetic pole in said first and third protruding legs, said alternating current flux being diverted from said first interface through a protruding leg having an induced magnetic pole opposite to that of said first pole piece, through said A.C. output winding, through a protruding leg having an induced magnetic pole opposite to that of said second pole piece and through said second interface.

5. A magnetic controller comprising a first ring of magnetic material and a second ring of magnetic material, said first and said second ring being positioned coaxially to one another, a first arm of magnetic material, said first arm being positioned between said first ring and said second ring, a second arm of magnetic materials, said second arm of magnetic material being positioned between said first and said second ring and in a position opposite to that of said first arm, said first and said second arms bisecting each of said rings into first and second arcs, an A.C. input winding wound on one of said arms, means to supply current to said A.C. input winding whereby alternating magnetic flux is produced in said magnetic arms and said magnetic rings, said A.C. flux normally following two paths through said arms and rings, said first path including said first arms, a first arc of said first ring, said second arm, a first arc of said second ring and said first arm, said second path including said first arm, the second arc of said first ring, said second arm, and the second arc of said second ring, an output-control winding, said output-control winding having a number of turns encompassing the first arcs of said first and second rings, said output-control winding having the same number of turns encompassing the second arcs of said first and second rings, the net magnetic flux linkage through said input-control winding being zero when said alternating magnetic flux is equally divided between said first and second paths, and means for applying a D.C. control voltage of reversible polarity to said control-output winding, said D.C. control voltage inducing a magnetic field in said rings such that said alternating said A.C. flux is unequally divided between said first and said second paths whereby an A.C. output voltage is induced across said control-output winding.

6. The magnetic controller recited in claim 5 and a unidirectional magnetic flux bias for said controller, said bias producing a flux in both of said paths such that said alternating flux produces no net flux reversal in either of said paths.

7. The magnetic controller recited in claim 6 wherein said magnetic flux bias is produced by a D.C. bias voltage, said D.C. bias voltage being applied across said input winding.

8. The magnetic controller recited in claim 6 wherein said unidirectional magnetic bias includes a permanent magnet, said permanent magnet being included in one or both of said arms.

9. The magnetic controller recited in claim 5 and an output transformer having primary and secondary windings, a capacitor, the primary winding of said transformer and said capacitor being connected in series across said control-output winding, the inductance of said primary winding and the capacitance of said capacitor being such that said transformer and said capacitor form a resonant circuit at the frequency of said A.C. input voltage, the secondary of said transformer providing said A.C. voltage output.

10. The magnetic controller recited in claim 9 wherein said D.C. control voltage is applied across said capacitor, a D.C. control voltage of one polarity diverting flux from said first path to said second path in accordance with the magnitude of said control voltage, said D.C. control voltage of the opposite polarity diverting flux from said second path to said first path in accordance with the magnitude of the said D.C. control voltage.

11. A magnetic controller comprising a body of magnetic material, an A.C. input winding wound on said body of magnetic material, means for supplying an alternating current to said A.C. input winding, said alternating current producing alternating magnetic flux in said body of magnetic material, a D.C. control winding wound on said body of magnetic material, an output winding wound on said body of magnetic material, means for supplying a D.C. control voltage of either polarity to said D.C. control winding, said output winding being positioned on said body of magnetic material so that normally the net A.C. flux linkage through said output coil is zero, said D.C. control winding being positioned on said body of magnetic material so that a D.C. control voltage of a first polarity diverts A.C. flux through said output coil to produce an A.C. output voltage in said output coil of a first phase, said D.C. control winding being positioned on said body of magnetic material so that an applied D.C. potential of the other polariy diverts flux through said A.C. output coil to produce an A.C. output voltage of the opposite phase, and a unidirectional flux bias source applied to said body of magnetic material, said unidirectional flux bias being of a sufficient magnitude so that the net alternating and unidirectional flux does not pass through the zero flux condition.

References Cited by the Examiner
UNITED STATES PATENTS

| | | | |
|---|---|---|---|
| 1,793,213 | 2/1931 | Dowling | 323—56 |
| 2,218,711 | 10/1940 | Hubbard | 323—56 |
| 2,474,624 | 6/1949 | Foerste | 323—44 |
| 2,527,881 | 10/1950 | Hartmann | 323—44 |
| 2,777,955 | 1/1957 | Gabor | 331—36 |
| 2,811,639 | 10/1957 | Sontheimer | 331—36 |
| 2,864,993 | 12/1958 | Schober | 323—56 |

LLOYD McCOLLUM, *Primary Examiner.*

JOHN KOMINSKI, *Examiner.*